(12) United States Patent
Petela et al.

(10) Patent No.: US 11,867,470 B2
(45) Date of Patent: Jan. 9, 2024

(54) U-BENDS WITH THE REDUCED PRESSURE LOSSES TO FLUID DISTRIBUTING NETWORKS

(71) Applicant: NOVA Chemicals (International) S.A., Fribourg (CH)

(72) Inventors: Grazyna Petela, Calgary (CA); Eric Clavelle, Calgary (CA); Edgar Yajure, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 818 days.

(21) Appl. No.: 16/736,857

(22) Filed: Jan. 8, 2020

(65) Prior Publication Data
US 2020/0141660 A1     May 7, 2020

Related U.S. Application Data

(63) Continuation of application No. 15/599,927, filed on May 19, 2017, now abandoned.

(30) Foreign Application Priority Data

May 25, 2016   (CA) ................. CA 2930824

(51) Int. Cl.
| | | |
|---|---|---|
| F28F 1/02 | (2006.01) | |
| F15D 1/04 | (2006.01) | |
| F16L 43/00 | (2006.01) | |
| F28D 7/06 | (2006.01) | |
| F28F 1/00 | (2006.01) | |

(Continued)

(52) U.S. Cl.
CPC ............ *F28F 1/02* (2013.01); *F15D 1/04* (2013.01); *F16L 9/006* (2013.01); *F16L 43/001* (2013.01); *F16L 43/002* (2013.01); *F16L 43/005* (2013.01); *F28D 7/06* (2013.01); *F28D 7/082* (2013.01); *F28F 1/00* (2013.01); *F28F 1/006* (2013.01); *F28F 1/025* (2013.01)

(58) Field of Classification Search
CPC ...... F28F 1/00; F28F 1/02; F28F 1/006; F28F 1/025; F15D 1/04; F16L 9/006; F16L 43/0001; F16L 43/002; F16L 43/005; F28D 7/06; F28D 7/082
USPC ........ 165/172; 422/310, 312, 132; 428/34.1; 703/2
See application file for complete search history.

(56) References Cited

U.S. PATENT DOCUMENTS

| | | |
|---|---|---|
| 2,056,782 A | 10/1936 | Fosdick |
| 5,044,208 A | 9/1991 | Corown et al. |

(Continued)

FOREIGN PATENT DOCUMENTS

| | | |
|---|---|---|
| GB | 713718 | 8/1954 |
| GB | 905076 | 9/1962 |
| WO | WO 99/20969 | 4/1999 |

OTHER PUBLICATIONS

Petrowiki.spe.org [online], "'Pressure drop evaluation along pipelines,'" Jun. 2015, retrieved on Sep. 26, 2019, retrieved from URL <https://petrowiki.spe.org/Pressure_drop_evaluation_along_pipelines>,22 pages.

*Primary Examiner* — Joel M Attey
(74) *Attorney, Agent, or Firm* — Fish & Richardson P.C.

(57) ABSTRACT

Provided herein are components for a fluid network modified for one or more objective functions of interest such as pressure drop, erosion rate, fouling, coke deposition and operating costs.

18 Claims, 6 Drawing Sheets

(51) Int. Cl.
*F16L 9/00* (2006.01)
*F28D 7/08* (2006.01)

(56) References Cited

U.S. PATENT DOCUMENTS

| | | | |
|---|---|---|---|
| 5,339,868 A | | 8/1994 | Naoi et al. |
| 5,875,640 A | | 3/1999 | Hill |
| 8,925,339 B2 | | 1/2015 | Kearney et al. |
| 2004/0226861 A1 | * | 11/2004 | Chien ................. C10G 1/10 208/132 |
| 2009/0026761 A1 | | 1/2009 | McMillan |
| 2010/0243208 A1 | | 9/2010 | Kar et al. |
| 2014/0178256 A1 | * | 6/2014 | Clavelle ............... C10G 9/16 422/198 |

* cited by examiner

U-BENDS WITH THE REDUCED PRESSURE LOSSES TO FLUID DISTRIBUTING NETWORKS

REFERENCE TO RELATED APPLICATION

This application is a continuation of U.S. Ser. No. 15/599,927, filed May 19, 2017, entitled "U-Bends With the Reduced Pressure Losses to Fluid Distributing Networks", which is herein incorporated by reference in its entirety.

Disclosed herein are components for fluid networks that include curved conduits such as branches, bends, by-passes, etc. which enforce multiple turns and direction changes on a flowing fluid stream. The fluid could be a liquid, gas, or multiphase flow such as a liquid-gas, liquid-solid (slurry) or gas-solid mixture. This network could be for fluid transport, distribution or recycling the working fluid in heating or cooling systems.

To date the pipe components for fluid networks have been circular in cross-section. The consideration of the cost of manufacture relative to efficiency of the components in terms of pressure drop and erosion rate has been largely weighted to minimize the cost of manufacturing. Hence the components have circular cross sections. With the increase in the price of feedstocks, the concern about greenhouse gas emissions, and desire to improve overall efficiencies in fluid systems the weighting of the factors in the design of components is starting to move toward the efficiency of the process. Several factors to be considered in the efficiency of the fluid network include the pressure drop across (i.e. along the length of) the fluid network the erosion rate of the components of the fluid network and the degree of sedimentation or forming deposit during the flow, which relates to fouling.

In one embodiment, the present disclosure seeks to provide the components individually and collectively for a fluid network which is fabricated to minimize any one of or combinations of pressure drop, fouling, erosion in the component(s), the assembled fluid network, or both, thus minimizing the cost (operating, capital or both).

Provided herein is a U-bend for a fluid network said U-bend having individually or in co-operative arrangement an internal flow passage having a continuously smooth and differentiable perimeter and centerline and a smoothly varying cross-section along the flow passage such that in the 5% of the flow passage from the inlet and the 5% of the flow passage from the outlet ARQ (as herein after defined) is from 1.0 to 1.02 and over the remaining 90% of the length of the flow passage not less than 5% of the flow passage has an ARQ from 1.02 to 1.15 and further wherein the presence of one or more of the U-bends reduces the overall pressure drop within the fluid network by 10% or more when compared to the calculated pressure drop for fluid network having a flow passage with an ARQ along its length from 1.00 to 1.02.

Also provided herein is a fluid network comprising at least one pipe connected to at least one U-bend, wherein said U-bend has individually or in co-operative arrangement an internal flow passage having a continuously smooth and differentiable perimeter and centerline and a smoothly varying cross-section along the flow passage such that in the 5% of the flow passage from the inlet and the 5% of the flow passage from the outlet ARQ is from 1.0 to 1.02 and over the remaining 90% of the length of the flow passage not less than 5% of the flow passage has an ARQ from 1.02 to 1.15 and wherein the presence of one or more of the U-bends reduces the overall pressure drop within the fluid network by 10% or more when compared to the calculated pressure drop for fluid network having a flow passage with an ARQ along its length from 1.00 to 1.02.

Also provided herein is a method to reduce the overall pressure drop within a fluid network by 10% or more when compared to the calculated pressure drop for fluid network having a flow passage with an ARQ along its length from 1.00 to 1.02, the method comprising using in the fluid network comprising at least one pipe connected to at least one U-bend, wherein said U-bend has individually or in co-operative arrangement an internal flow passage having a continuously smooth and differentiable perimeter and centerline and a smoothly varying cross-section along the flow passage such that in the 5% of the flow passage from the inlet and the 5% of the flow passage from the outlet ARQ is from 1.0 to 1.02 and over the remaining 90% of the length of the flow passage not less than 5% of the flow passage has an ARQ from 1.02 to 1.15.

BRIEF DESCRIPTION OF THE DRAWINGS

The features, benefits and aspects of the present disclosure are best understood in the context of the attached figures in which like parts or features are designated by like numbers.

As used in this specification "fluid network" means piping systems, tube heat exchangers, coolers, heaters, fluid conduits, installations where the flowing medium, which is gas or liquid or slurry or multiphase fluid, is forced to change a direction by an angle of 90° to 200°, in multiple passes.

As used in this specification "ARQ" means the ratio of aspect ratio (AR) to isoperimetric quotient (Q) of a section or segment of the flow passage perpendicular to the direction of flow (AR/Q), which is described in more detail herein below.

As used in this specification "relatively smoothly" or "smoothly varying" in relation to the ARQ means the quotient does not change by more than about 7% over a about 5% length of the flow passage.

As used in this specification "smooth in relation to the perimeter of the flow passage" means the perimeter at an angle perpendicular to the flow is a differentiable continuous smooth line (i.e., having no kinks or discontinuities). As a result the perimeter of the flow passage will not be a geometric shape having straight sides and "corners" or "angles" such as a square, a parallelogram or a triangle. Rather the perimeter of the flow passage is defined by a continuous smooth curved line.

As used in this specification "smooth in relation to the center line of the flow passage" means the center line of the flow passage is a differentiable continuous smooth line (i.e. having no kinks or discontinuities). While the center line of the flow passage may change rapidly, it will not include abrupt, sharp changes of internal section (steps).

As used in this specification "Rb" is the half the distance between the center of the two tubes or pipes being connected by the U-bend. D is the internal diameter of the tube or pipe.

As used in this specification "building a computational model" means creating a virtual three dimensional geometric model of one or more component(s) or a reactor and filling it with a three dimensional computational mesh to create cells (e.g. 5,000 cells to greater than 100,000 cells).

"ARQ" is defined as the ratio of aspect ratio (AR) to isoperimetric quotient (Q) of a section or segment of the flow passage perpendicular to the direction of flow (AR/Q). The aspect ratio (AR) is defined as the ratio of long to short side of the smallest-area rectangle into which a particular section can be circumscribed. This ratio, for the case of a convex ovoid section symmetric about one axis, is equal to the ratio of the major chord to minor chord. The major chord is the length of the longest straight line between two points in the perimeter of a closed section which may or may not cross the centroid of the section. The minor chord for such a section is the longest distance perpendicular to the major chord between two points along the perimeter of the section. It will appear clear to those skilled in the art that thus defined the aspect ratio is greater than one.

AR=Long/Short

The isoperimetric quotient is defined as four times Pi ($\pi$) times the Area of the section of the flow passage divided by the square of that section's perimeter. At a cross section of the flow path if the area of the cross section is A and the perimeter is L, then the isoperimetric quotient Q, is defined by $$Q = \frac{4\pi A}{L^2}$$

Figure 1:
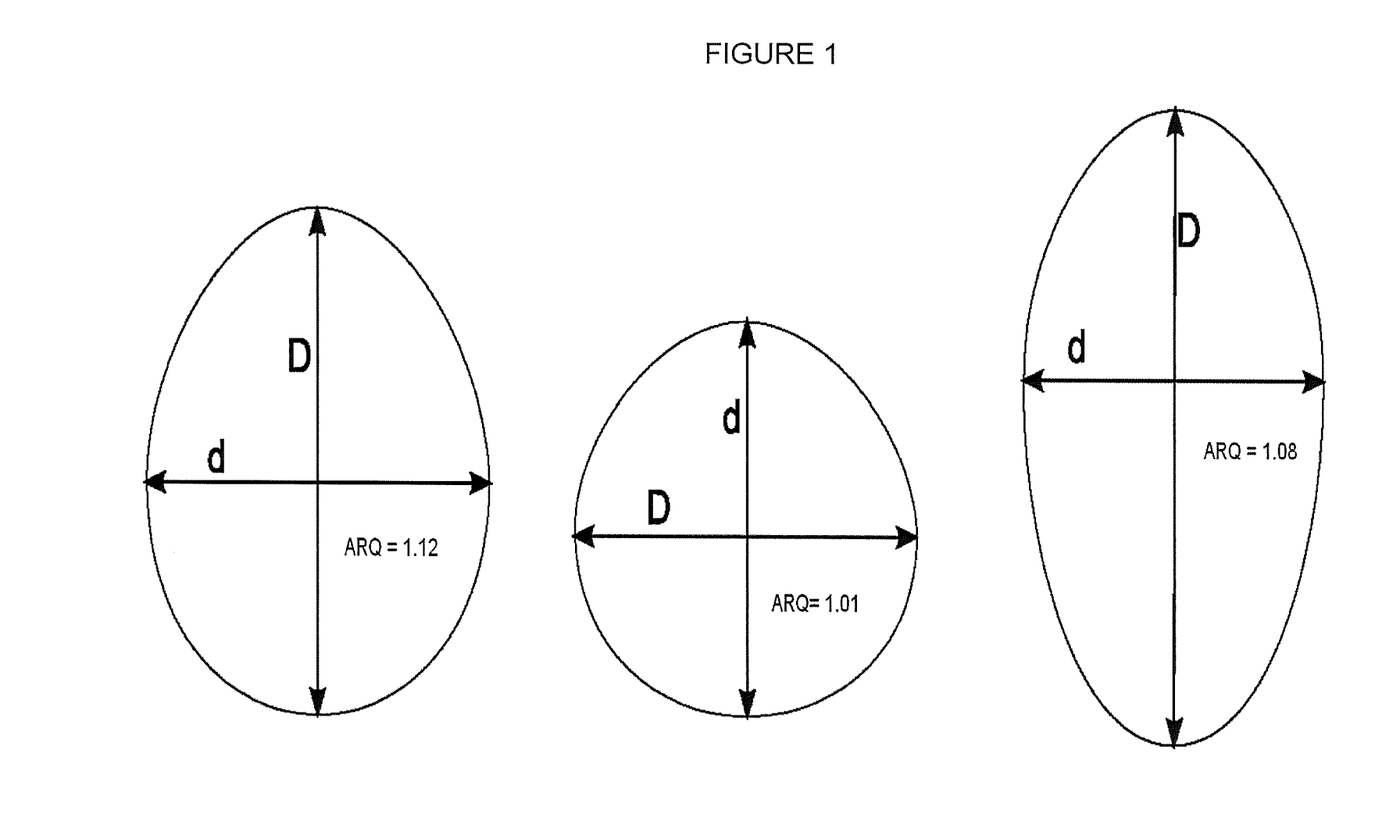
FIG. 1 shows different cross sections of a flow passage having an ARQ greater than 1.
Figure 2:
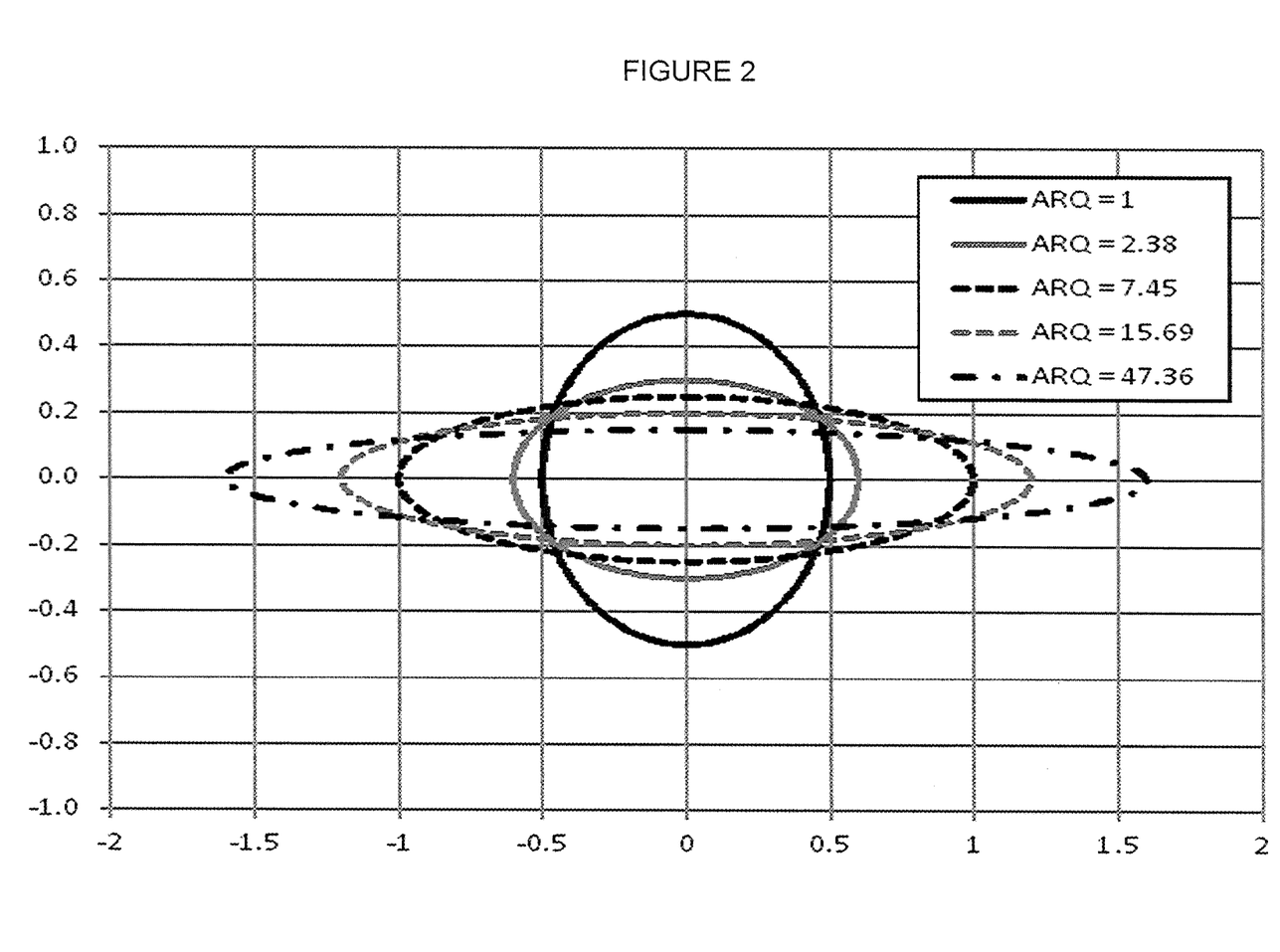
FIG. 2 shows a series of overlays of equal perimeter ellipses having different ARQ equal to or greater than 1.

The isoperimetric quotient is a measure of circularity. This is illustrated in FIG. 1 and FIG. 2. A circle is the only cross-sectional shape with an isoperimetric quotient of one and all other cross-sectional shapes have an isoperimetric quotient less than one.

Since the ARQ ratio is the aspect ratio (AR) divided by the isoperimetric quotient (Q) and as defined AR is greater than one and Q is less than one, ARQ is also greater than one and greater than or equal to the aspect ratio.

FIGS. 1 and 2 demonstrate that even an ARQ near but not equal to 1 can be noticeably non-circular.

Sample calculation of an ARQ ratio:

An ellipse with a major radius "a" and a minor radius "b" has a cross sectional area A=Pi*a*b. The perimeter of such an ellipse can be approximated by Ramanujan's formula which states the perimeter of an ellipse being approximately:

$$L \approx \pi[3(a+b) - \sqrt{(3a+b)(3b+a)}]$$

For a particular example of an ellipse having a major radius "a" equals four times the minor radius "b", it would have an Area A=4*Pi*$b^2$. This four-to-one ellipse has a perimeter L $$L \approx \pi[3(5b) - \sqrt{(12b+b)(3b+4b)}]$$

$$L \approx \pi[15b - \sqrt{91b^2}] \approx 5.461\pi b$$

So a four-to-one ellipse has an isoperimetric quotient Q equal $$Q \approx \frac{16\pi^2 b^2}{29.822\pi^2 b^2} \approx 0.537$$

And since the aspect ratio of this section is 4, the ARQ of such a section is 7.45

In comparison, standard pipe has an out-of round tolerance of plus or minus 1.5% and as such, the maximum ARQ of a nominally round section is approximately 1.0151.

The pipes useful with the embodiments disclosed herein are straight, or are substantially straight, meaning the pipe may have some curves or bends, but over the length of the pipe the direction does not change by more than 20 degrees. In some embodiments the pipes may be composed of multiple sections connected by such methods as welding, threaded joints or flanges. In some embodiments, the L/D of the pipe connecting the U-bend is greater than 0 and less than 55. In some embodiments, the L/D of the pipe connecting the U-bend is greater than 0 and less than 45. In some embodiments, the L/D of the pipe connecting the U-bend is greater than 0 and less than 20. In some embodiments, the Rb/D is greater than 1 and less than 4. In some embodiments, the Rb/D is greater than 1 and less than 3 where. In some embodiments, the Rb/D is greater than 1 and less than 2.

The embodiments of this disclosure may work with any number of U-bends connected by an appropriate number of pipes to create a fluid network system. In some embodiments, the fluid networks of this disclosure comprise one or more U-bends connected by pipes. In some embodiments, the fluid network comprises five (5) or more U-bends connected by pipes. In some embodiments, the fluid network comprises fifty (50) or more U-bends connected by pipes. In some embodiments, the fluid network comprises 100 or more, or 150 or more, or 200 or more, U-bends connected by pipes. The number of U-bends connected by pipes is one factor taken into consideration when designing the overall shape and size of a fluid network.

Figure 3:
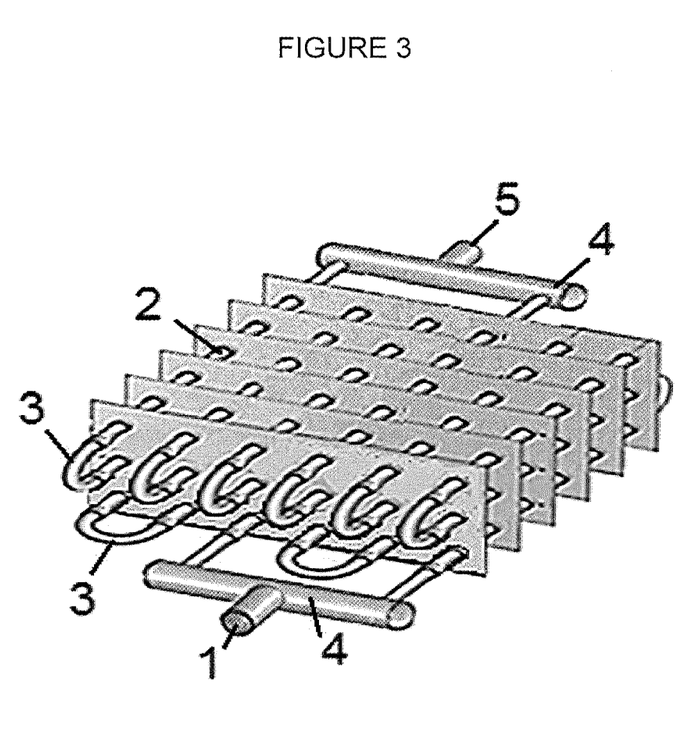
FIG. 3 is an isometric view of a typical fluid network as an example of prior art.

FIG. 3 is an isometric drawing of a fluid network (in this case a heat exchanger) in which a gas or liquid flowing within the tubes is cooled by a gas flowing over the outside of the tubes. The fluid network comprises one or more inlets 1, multiple straight tubes or pipes 2, multiple U-bends or 180 degree bends 3, a flow combining manifold 4 and an outlet or exit 5. U-bend, 3, is an example of a U-bend whose modification is the subject of this disclosure.

In FIG. 3 cross sections at all positions along fluid network length are circular typically having an out-of round tolerance of plus or minus 1.5% and as such, the maximum ARQ of a nominally round section is approximately 1.0151.

In the components of the prior art the flow passage was circular along its entire length albeit expanding as described below and the ARQ along the serpentine reactor is essentially 1 (e.g. from 1.0 to 1.02).

The cross sectional area of the flow passage varies along the length of the components in the direction of flow of the gas but all cross-sections are substantially round with an ARQ of 1 other than by unintentional variations of tolerance plus or minus 2% (Maximum ARQ of 1.02).

In some embodiments, provided herein is a U-bend for a fluid network said U-bend having individually or in cooperative arrangement an internal flow passage having a continuously smooth and differentiable perimeter and centerline and a smoothly varying cross-section along the flow passage such that in the 5% of the flow passage from the inlet and the 5% of the flow passage from the outlet ARQ is from 1.0 to 1.02 and over the remaining 90% of the length of the flow passage not less than 5% of the flow passage has an ARQ from 1.02 to 1.15 and further wherein the presence of one or more of the U-bends reduces the overall pressure drop within the fluid network by 10% or more when compared to the calculated pressure drop for fluid network having a flow passage with an ARQ along its length from 1.00 to 1.02.

The embodiments disclosed herein may work with a U-bend of any degree of bending. In some embodiments, the bend in the U-bend is between about 90 and about 180 degrees. In some embodiments, the bend in the U-bend is between about 95 and about 180 degrees. In some embodiments, the bend in the U-bend is between about 120 and about 180 degrees. In some embodiments, the bend in the U-bend is between about 90 and about 175 degrees. In some embodiments, the bend in the U-bend is between about 90 and about 160 degrees. In some embodiments, the bend in the U-bend is between about 90 and about 120 degrees. In some embodiments, the bend in the U-bend is about 90 degrees, or about 120 degrees or about 180 degrees. In some embodiments, in a fluid network the U-bends may all have the same degree of bending. In some embodiments, some or all of the U-bends in the fluid network may have different degrees of bending. The degree of bending is one factor taken into consideration when designing the overall shape and size of a fluid network.

Figure 4:
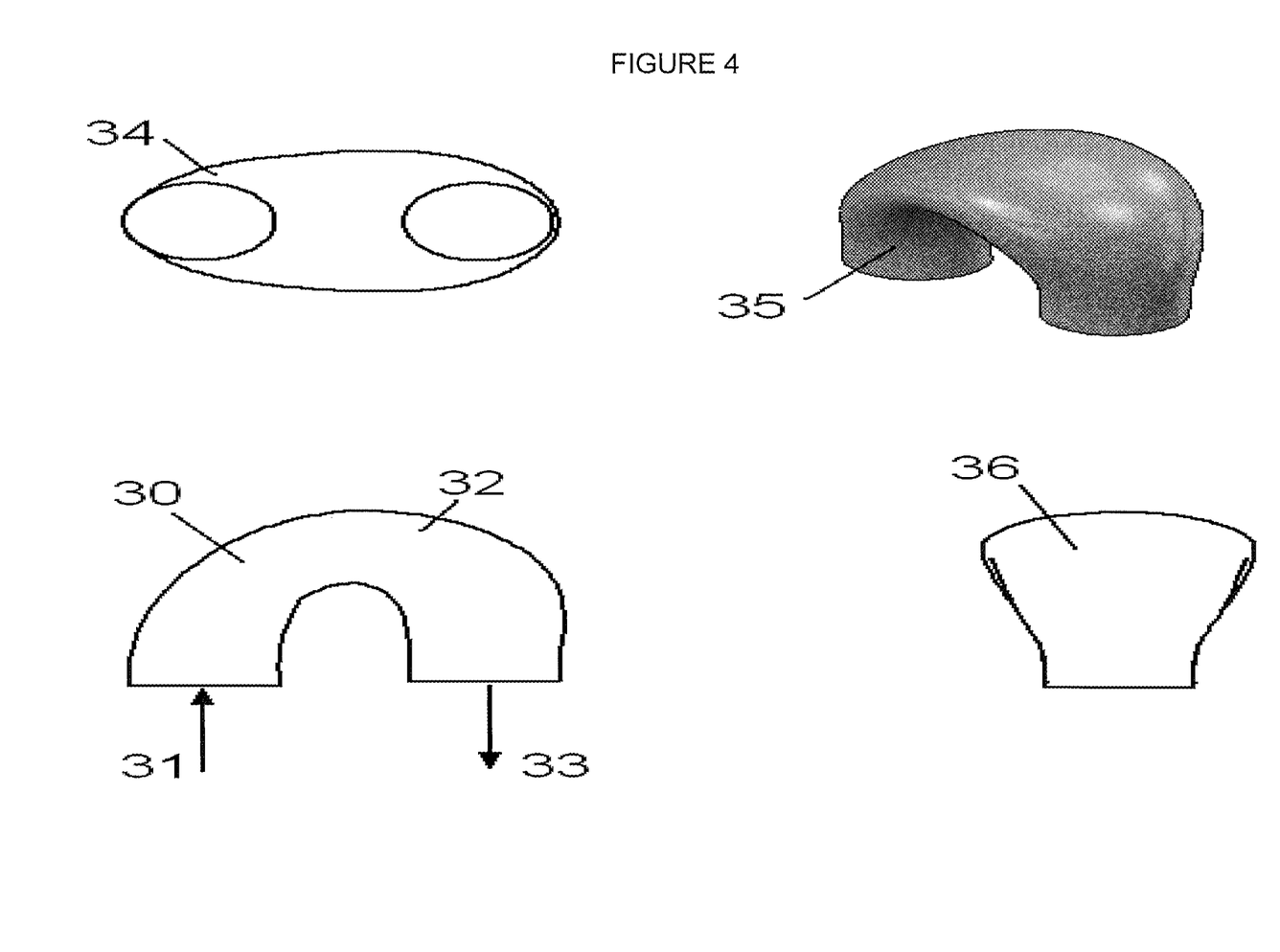
FIG. 4 shows multiple views of a U-bend or 180 degree bend in accordance with the present disclosure

FIG. 4 has several views of a component, a "U" bend.

The U-bend 30 an inlet 31 a body 32, and exit or outlet 33. The gas or liquid enters at the inlet 31, passes through the body 32 turns through 180 degrees and exits at 33. The inlet 31 and exit 33 of the "U" bend is circular or substantially circular. 32 is a side view, 34 is a bottom view, 35 an isometric view, and 36 is and end view of the component ("U" bend).

Figure 5:
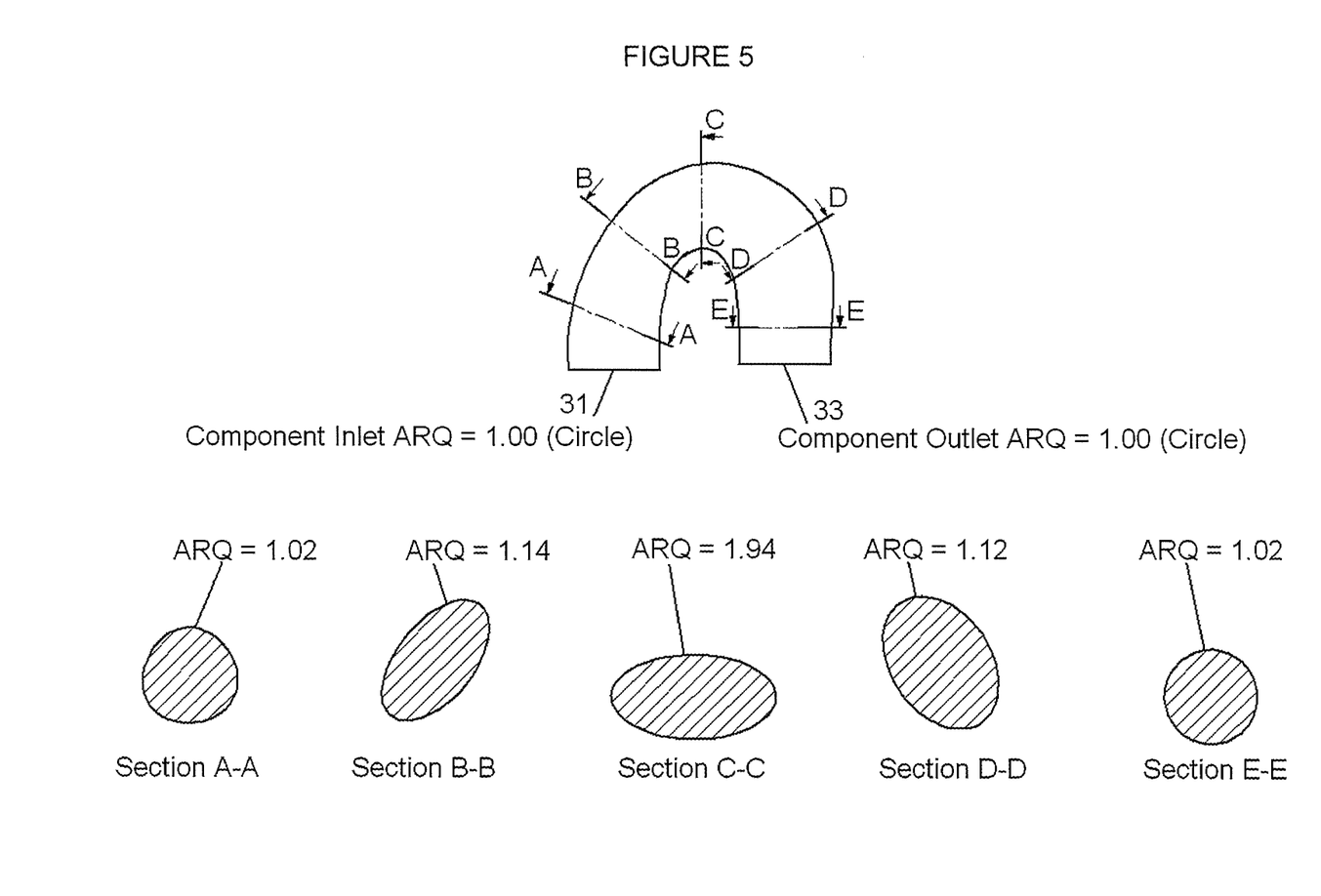
FIG. 5 is a sectional view along the flow passage of FIG. 4 and cross sections at A, B, C, D and E.

FIG. 5 shows a sectional view of the component ("U" bend) of FIG. 4 in accordance with the various embodiments of this disclosure. The cross sections at A-A, B-B, C-C, D-D and E-E as well as the inlet and outlet are also shown. The cross section at the inlet 31 and exit 33 in FIG. 4 of the "U" bend are essentially circular. However, the cross sections as A-A, B-B, C-C, D-D, and E-E have respective ARQ values of 1.02, 1.114, 1.94, 1.12, and 1.02. Clearly, cross sections, B-B, C-C, and D-D are not circular. Arguably cross sections A-A and E-E are not circular.

In this embodiment, the ARQ varies smoothly from 1 at either end (inlet 31 and exit 33 (round furnace pipe at both ends)) but reaches a maximum non-roundness with a maximum ARQ of 1.94 at C-C.

The shape of the cross section of the flow passage may be elliptical, ovoid, segmented or asymmetric in nature. The area of the cross-section may also be held constant, increase or decrease according to the function to be achieved. A twist may optionally be imposed on adjacent cross sections either by means of interior swirling vanes or beads (e.g. a welded bead on the interior of the pipe) within the fluid network or by the bulk twisting of the cross sections relative to each other.

However, it should be noted that different shapes may have a comparable ARQ and that a low change in the quotient may in fact result in a significant change in the cross section shape of the flow passage such as from a near ellipse to a "flattened egg shape". This is demonstrated in FIGS. 1 and 2. A 1% change in ARQ can have a profound effect on the flow characteristics as indicated by pressure drop, for example.

The cross section of the component within the last 5% of the flow passage from the inlet and 5% of the flow passage from the exit or outlet of the component have an ARQ approaching unity from above, typically from 1.02 to 1.0, for example from 1.01 to 1. This helps with component assembly and reduces redundancy of comparable components.

In the remaining 90% of the flow passage, there are one or more sections where the ARQ is from 1.02 to 1.50, for example from 1.02 to 1.3, and for example, from 1.02 to 1.12, and for example, from 1.05 to 1.12, and for example, from 1.10 to 1.15. The interior of the flow passage is "smooth" in the sense that the change in the ARQ in 5% sections of the remaining flow passage does not change by more than 7%, or for example, less than 5%. In some embodiments, over the remaining 90% of the length of the flow passage not less than 10% of the flow passage has an ARQ from 1.02 to 1.15. In some embodiments, over the remaining 90% of the length of the flow passage the ARQ does not change by more than 7% over a 5% length of the flow passage. In some embodiments, the ARQ of about 80% of the length of the flow passage does not change by more than 5% over a 5% length of the flow passage.

The shape of the cross sections of the flow passage is optimized to obtain a local beneficial minimum or maximum (known collectively as extrema) of an objective function. Such objective function may be any parameter affecting the economics of the operation of the transfer line including the cost (capital and or operating) itself include but is not limited to pressure drop, erosion rate of the fluid-contacting surfaces, weight of the component, temperature profile, residence time and rate of fouling (or coke deposition).

There are a number of software applications available which are useful in the design of optimized network elements disclosed herein. These include SOLIDWORKS software for the creation and parametric manipulation of the flow geometry, ANSYS MECHANICAL software for the calculation of material stress and ANSYS FLUENT software to determine the flow pattern, pressure drop and erosion rate used in calculating the objective function corresponding to a particular geometry.

Procedurally, one way to find a local objective function extremum is by sequentially applying a small perturbation to a parameter affecting the shape of the component and determining the resulting value of the objective function by either analytical techniques, experiments or numerical computation. A deformation parameter is defined as a value which can be uniquely mapped to a change in geometry by means of scaling, offsetting or deforming any or all of the sections in a deterministic fashion. Each parameter may also be bounded to prevent geometric singularities, unphysical geometries or to remain within the boundaries of a physical solution space. After each of a finite and arbitrary number of parameters has been perturbed, any one of a series of mathematical techniques may be used to find the local extremum. In one such technique a vector of steepest approach to the objective function extremum is determined as a linear combination of parameter changes. The geometry is progressively deformed in the direction of steepest approach and the value of the objective function determined for each deformation until a local extremum is found. The process is then restarted with a new set of perturbations of the parameter set. Other techniques that may be used to advance the search for a local extremum include Multi-objective genetic algorithms, Metamodeling techniques, the Monte Carlo Simulation method or Artificial Neural Networks.

For example, a model of the original design is built. That is a three dimensional finite model of the component is created. The model must include the internal flow passage (void) within the component. The model may also include the external surface of the component. The model is then divided into (filled with) cells, typically from 5,000 to more than 100,000 (e.g. 150,000). To some extent this is dependent on computing power available and how long it will take to run the programs for each deformation of the original model. There are a number of computer programs which may be used to build the original model such as for example finite element analysis software (e.g. ANSYS MECHANICAL software).

Then the model needs to be "initialized". That is a fluid dynamics and energy (of mass, energy and momentum etc.) dynamics computer program is applied to each cell of the model to solve the operation of that cell at given operating conditions for the component (e.g. mass of gas passing through the component, flow velocity, temperature, and pressure, erosion rate, fouling rate, recirculation rate etc.) to calculate one or more objective functions. The sum of the results of each cell operation describes the overall operation of the component. This is run iteratively until the model and its operation approach, or closely match actual plant data. Generally the model should be initialized so that for one or more of objective functions, the simulation is within 5%, or for example, within 2%, or for example, within 1.5% of the actual plant operating data for that objective function of the transfer line exchanger. One fluid and/or energy dynamics program which is suitable for the simulation is ANSYS FLUENT software.

Once the design of the component and its operation is initialized the model of the component is iteratively deformed, for example in a small manner but incremental manner and the simulated operation of the deformed part is run to determine the one or more objective functions for the deformed component (for the cells and the sum of the cells or even cells in specified location or regions (at the internal radius of curvature of a bend). Typically the deformation is applied to all or part of the flow channel of the component within 5% of the flow channel downstream of the inlet to 5% of the flow channel upstream of the exit (i.e. 90% of the component is available for deformation). In some instances the deformation may occur in one or more sections or parts within 10% of the flow channel downstream of the inlet to 10% of the flow channel upstream of the exit (i.e. 80% of the component is available for deformation). While the deformation could be applied to the whole length of component available for deformation it may be useful to apply the deformation to sections or portions of the component. For example the last or first half, third or quarter or combinations thereof could be deformed. The results (e.g. one or more objective functions and the sum of each such objective function) of the simulated operation of the deformed component are stored in the computer.

The deformation of the component may be accomplished by applying a further computer program to the design which incrementally deforms the part. One such commercially available deformation and optimization software is sold under the trademark SCULPTOR. However, it may be desirable to use a neural network to optimize the location and degree of deformation to speed up or focus the iterative process.

The stored calculated objective function(s) for the operation of the deformed component are then compared until either:

1) the extrema of one or more objective functions is reached; or
2) the rate of change in the one or more objective functions is approaching zero.

In one embodiment, a method to optimize one or more of the operating characteristics of a fixed industrial flow passage defined by a continuous metal envelope, selected from pressure drop, heat transfer rate, erosion rate, and coke deposition rate is provided, the method comprising:
1. building a numerical model comprising not less than 5,000, or for example, more than 100,000, computational cells of the portion of the flow channel typically from 5% of the flow channel downstream of the inlet and to 5% of the flow channel upstream of the outlet (e.g. 90% of the of the flow channel of the transfer line) of the initial design;
2. simulating (on a computational cell level and summed) the operation of the model design from step 1 using fluid and energy dynamics software under the industrial pressure, temperature, and flow rate conditions of operation to numerically determine one or more of the functions of interest (pressure drop, heat transfer rate, erosion rate, fouling rate and cost (capital and operating)) approach (within 5%) or match actual operating conditions;
3. iteratively;
a) deforming said numerical model comprising not less 5,000 computational cells by defaulting the geometry such that the resulting ARQ of the section is materially greater than 1.02;
b) simulating the operation of the deformed model under the plant operating conditions used in step 2 to determine one or more objective functions of interest (e.g. pressure drop, heat transfer rate, erosion rate, fouling rate, and cost (capital and/or operating);
c) calculating and storing said one or more of functions of interest calculated in step b);
d) using some or all of the stored results from step 3c) with an optimization algorithm to estimate a deformation that will improve the objective function;
e) comparing the stored objective functions of interest until one or both of the following conditions are met:
i) the objective function reaches the desirable local extrema; or
ii) the objective function ceases to change in the parametrized direction.

Some objective function value, for example pressure drop, erosion rate and heat transfer rate, at each evaluation stage in the process of finding the local extremum can be obtained via Computational Fluid Dynamics. If the change in transfer line cross-sections along the flow passage is selected so that the calculated total pressure drop across the line decreases by 10% from the baseline condition made of standard components (i.e. where the ARQ is from 1 to 1.02 along the 90% or 80% of transfer line flow passage) which is used as a comparison benchmark and the heat transfer rate of the line is decreased by more than 5% compared to the baseline calculated using a combination of structural finite element analysis software; computational fluid dynamics simulation of the flow rate and a geometry manipulating software that alters the shape of the transfer line in a parametric fashion. In some embodiments the models will be run until the change in objective function between successive iterations is less than 10% or, for example, less than 1%.

Also provided herein are methods to reduce the overall pressure drop within a fluid network by 10% or more when compared to the calculated pressure drop for fluid network having a flow passage with an ARQ along its length from 1.00 to 1.02, in one embodiment, the method comprising using in the fluid network comprising at least one pipe connected to at least one U-bend, wherein said U-bend has individually or in co-operative arrangement an internal flow passage having a continuously smooth and differentiable perimeter and centerline and a smoothly varying cross-section along the flow passage such that in the 5% of the flow passage from the inlet and the 5% of the flow passage from the outlet ARQ is from 1.0 to 1.02 and over the remaining 90% of the length of the flow passage not less than 5% of the flow passage has an ARQ from 1.02 to 1.15.

In some embodiments, provided herein is a fluid network comprising at least one pipe connected to at least one U-bend, wherein said U-bend has individually or in co-operative arrangement an internal flow passage having a continuously smooth and differentiable perimeter and centerline and a smoothly varying cross-section along the flow passage such that in the 5% of the flow passage from the inlet and the 5% of the flow passage from the outlet ARQ is from 1.0 to 1.02 and over the remaining 90% of the length of the flow passage not less than 5% of the flow passage has an ARQ from 1.02 to 1.15 and wherein the presence of one or more of the U-bends reduces the overall pressure drop within the fluid network by 10% or more when compared to the calculated pressure drop for fluid network having a flow passage with an ARQ along its length from 1.00 to 1.02.

In some embodiments, the fluid network comprising pipes and U-bends displays an overall pressure drop within the fluid network of 15% or more. In some embodiments the fluid network comprising pipes and U-bends displays an overall pressure drop within the fluid network of 20% or more. In some embodiments the fluid network comprising pipes and U-bends displays an overall pressure drop within the fluid network of 50% or more. In some embodiments the fluid network comprising pipes and U-bends displays an overall pressure drop within the fluid network of less than 5%. In some embodiments the fluid network comprising pipes and U-bends displays an overall pressure drop within the fluid network of less than 10%. In some embodiments the fluid network comprising pipes and U-bends displays an overall pressure drop within the fluid network of less than 15%.

In some embodiments, the fluid network is a heat exchanger, such as e.g. a shell-tube heat exchanger which comprises multiple tube passes, forced draft exchangers comprising tube bundles, U-tube waste heat boilers, etc.

In some embodiments, the fluid network is a fluid transporting network. In some embodiments the fluid network is a fluid transporting network selected from pipelines and hydraulic systems, such as water supply distribution or wastewater collection systems. Particular application could be for compact liquid distribution systems such as liquid handling and dosing, dissolving/blending or conditioning systems in food/beverages/juices processing plants.

In some embodiments, the fluid network is fluid processing equipment or is a fluid processing device wherein fluid condenses or evaporates when in contact with the fluid network. In some embodiments the fluid network is fluid processing equipment or is a fluid processing device wherein fluid changes its temperature when in contact with the fluid network. In some embodiments the fluid network is fluid processing equipment or is a fluid processing device wherein fluid undergoes a chemical reaction with or without participation of other substances or components when in contact with the fluid network. In some embodiments the fluid network is a part of a larger fluid processing network. In some embodiments the fluid network is a fluid distribution network.

In one embodiment, when compared to a baseline of a conventionally designed component, a decrease in total pressure drop of over 10% is observed and the subsequent, sedimentation rate, or erosion rate or fouling rate is also affected and decreased when compared to the baseline conditions.

In some embodiments, either the erosion rate, or the fouling rate or sedimentation rate (or any combination thereof) in the fluid network is decreased by not less than 10% compared to the fouling or sedimentation rate for a fluid network having a flow passage with an ARQ along its length from 1.00 to 1.02.

Demonstration:

Provided, by way of example only, is a modification of NOVA Chemicals commercial ethylene cracking furnace convection section piping (i.e., a heat exchanger) at Joffre and Corunna.

The commercial finite element analysis software and computational fluid dynamic software have been used to model the convection section with the sufficient accuracy to generally predict the commercial operation of industrial plants.

First, the numerical model of the convection section with conventional U-bends as shown in FIG. 3, was created. The pressure drop and erosion rate were determined using ANSYS FLUENT software.

Using the shape deformation and optimization software, SCULPTOR, the circular cross section of the conventional U-bend or 180 degree bend component computational or numerical model was modified into an arbitrary shape independently at several transverse planes of the original connecting pipe to generate a "deformed" shape based on a series of deformation parameters per section. The ARQ of the resulting sections having a maximum ARQ substantially greater than 1.02. The metallurgy of the pipe was maintained constant for these models. The pressure drop and erosion rate were also calculated for the "deformed" pipe.

The process was applied iteratively until no further improvements in pressure drop or erosion rate were found. The resulting geometry and ARQ values are shown in FIG. 4 and FIG. 5. Table 1 is a summary of representative data from the computer modeling.

TABLE 1

| Simulation or Iteration Number | Reduction in U-Bend Pressure Drop | Reduction in Erosion Rate |
| --- | --- | --- |
| 1 (Initial U-bend in FIG. 3) | 0% | 0% |
| 2 | 39% | 24% |
| 3 | 41% | 23% |
| 4 | 47% | 26% |
| 5 | 49% | 32% |
| 6 | 49% | 30% |

The numerical results show that although the change in ARQ of the modified U-bends appears to be moderate, as FIG. 5 indicates, the resulting change in pressure drop and erosion rate performance, which are summarized in Table 1, has been dramatic.

Figure 6:
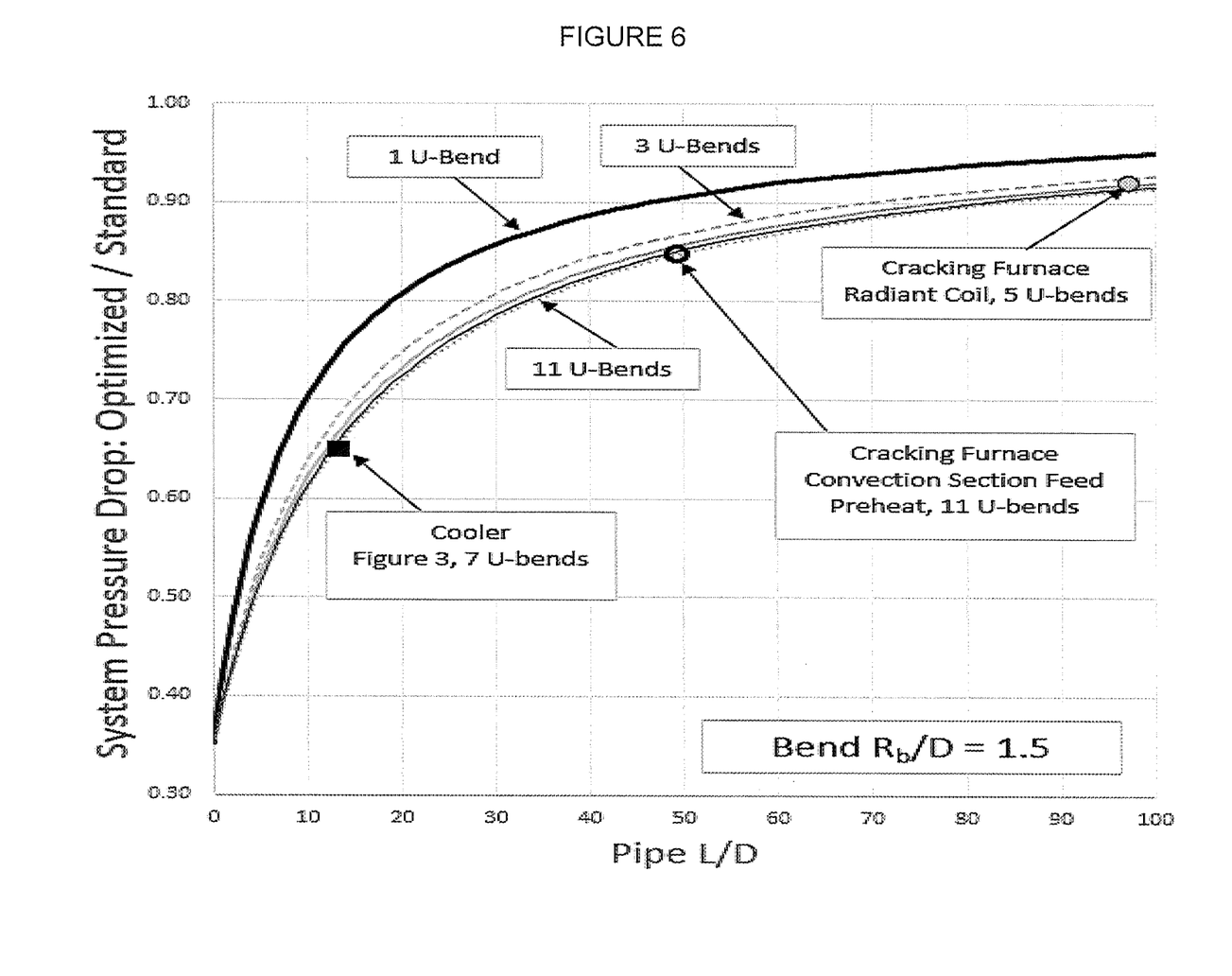
FIG. 6 is a graph of network system pressure drop improvement vs. network length and the number of U-bends.

More generally, a fluid network composed of one or more modified U-bends described herein, connected by straight or essentially straight pipes can be evaluated in terms of the reduction in overall pressure drop relative to the same fluid network with the conventional U-bends having the circular cross-section. FIG. 6 shows, a plot of the pressure drop reduction in a fluid network composed of one to eleven U-bends (though the various embodiments disclosed herein need not be limited to eleven U-bends) interconnected by straight tubes. The bottom axis of the graph is the pipe length made non-dimensional and hence universally comparable by dividing through by the internal diameter. This is called the tube or pipe L/D. The vertical axis is the ratio of the calculated overall pressure drop with optimized U-bends and the overall pressure drop with standard U-bends. The ratio value of 1.0 indicates that there is no benefit in terms of pressure reduction resulting from U-bend modification. Lower ratio values on the vertical axis indicate the improvement, i.e. pressure loss reduction resulting from the U-bend modification. The different curves show the impact of the number of U-bends that are incorporated into the considered network/heat exchanger. The U-bends in this example have a non-dimensional bend radius Rb/D of 1.5 which is typical for compact and efficient heat exchangers. Rb is the half the distance between the center of the two tubes or pipes being connected by the U-bend. D is the internal diameter of the tube or pipe. However, the conclusions of the example are not limited to a bend radius Rb/D of 1.5, nor is the application of optimized U-bends to heat exchangers limited to a bend radius Rb/D of 1.5.

It can be seen that for all combinations of number of U-bends and tube L/D, the use of modified U-bends shows a definite benefit. The most significant benefit is in exchangers with a lower L/D and larger number of U-bends. Marked on the plot is the pressure drop reduction of a typical ethylene cracking furnace such as described in US 2014178256A1. The reduction in pressure drop is approximately 8% due to u-bend modification. Also indicated is the reduction in pressure drop for a typical convection section heat exchanger (example discussed above) and a typical cooler similar to the one shown in FIG. 3. It can be seen that with these heat exchangers the L/D in particular is lower and that the benefit of pressure drop reduction after u-bend modification is significant. For the convection section heat exchanger indicated, the pressure drop reduction is 15%. For the cooler indicated the pressure drop reduction is 35%.

The present invention has been described with reference to certain details of particular embodiments thereof. It is not intended that such details be regarded as limitations upon the scope of the invention except insofar as and to the extent that they are included in the accompanying claims.

What is claimed is:

1. A method of operating a fluid distributing network for fluid transport or for fluid distribution or for recycling a fluid in a heating or a cooling system comprising:
   providing the fluid distributing network with at least one U-bend and at least one pipe connected to the U-bend, wherein the U-bend comprises an inlet, an outlet, and a bend; said U-bend having individually or in co-operative arrangement a flow passage having a continuously smooth and differentiable perimeter and centerline and a smoothly varying cross-section along the flow passage such that in the 5% of the flow passage from the inlet and the 5% of the flow passage from the outlet ARQ is from 1.0 to 1.02 and over the remaining 90% of the length of the flow passage not less than 5% of the flow passage has an ARQ from 1.02 to 1.15;
   operating the fluid distributing network in a manner that allows for fluid transport or for fluid distribution or for recycling a fluid in a heating or a cooling system;
   and further wherein the presence of the at least one U-bend reduces the overall pressure drop within the fluid distributing network by 10% or more when compared to the calculated pressure drop for a comparative fluid distributing network operating under the same conditions for the same purpose, but having only conventional bends with a comparative flow passage with an ARQ along its length from 1.00 to 1.02, wherein ARQ is the ratio of aspect ratio (AR) to isoperimetric quotient (Q) of a section or segment of the flow passage perpendicular to the direction of flow (AR/Q), wherein L is the length of the at least one pipe and D is the inner diameter of the at least one pipe and further wherein L/D of the at least one pipe is greater than 0 and less than 55.

2. The method of operating a fluid distributing network of claim 1 wherein the fluid distributing network comprises at least two U-bends.

3. The method of operating a fluid distributing network of claim 1 wherein the fluid distributing network comprises at least five U-bends.

4. The method of operating a fluid distributing network of claim 1 wherein the fluid distributing network comprises at least fifty U-bends.

5. The method of operating a fluid distributing network of claim 1 wherein L is the length of the at least one pipe and D is the inner diameter of the at least one pipe and further wherein L/D of the at least one pipe is greater than 0 and less than 20.

6. The method of operating a fluid distributing network of claim 1 wherein the U-bend has a bend of between 90 and 180 degrees.

7. The method of operating a fluid distributing network of claim 1 wherein two pipes are connected by the U-bend and wherein Rb is half the distance between the center of the two pipes connected by the U-bend, and D is the inner diameter of the two pipes and further wherein Rb/D is greater than 1 and less than 4.

8. The method of operating a fluid distributing network of claim 1 wherein two pipes are connected by the U-bend and wherein Rb is half the distance between the center of the two pipes connected by the U-bend, and D is the inner diameter of the two pipes and further wherein Rb/D is greater than 1 and less than 3.

9. The method of operating a fluid distributing network of claim 1 wherein erosion rate of the fluid distributing network is decreased by not less than 10% compared to the erosion rate for a fluid distributing network operating under the same conditions for the same purpose having only convention bends that have a flow passage with an ARQ along its length from 1.00 to 1.02.

10. The method of operating a fluid distributing network of claim 1 wherein an erosion rate of the fluid distributing network is decreased by not less than 10% compared to the erosion rate for a fluid distributing network operating under the same conditions for the same purpose having only convention bends that have a flow passage with an ARQ along its length from 1.00 to 1.02.

11. The method of operating a fluid distributing network of claim 1 wherein a fouling or sedimentation rate of the fluid distributing network is decreased by not less than 10% compared to the fouling or sedimentation rate for a fluid distributing network operating under the same conditions for the same purpose having only convention bends that have a flow passage with an ARQ along its length from 1.00 to 1.02.

12. The method of operating a fluid distributing network of claim 1 wherein the overall pressure drop within the fluid distributing network is reduced by 15% or more.

13. The method of operating a fluid distributing network of claim 1 wherein the overall pressure drop within the fluid distributing network is reduced by 20% or more.

14. The method of operating a fluid distributing network of claim 1 wherein the fluid distributing network is a heat exchanger.

15. The method of operating a fluid distributing network of claim 1 wherein the fluid distributing network is a fluid transporting network.

16. The method of operating a fluid distributing network of claim 1 wherein the fluid distributing network is a fluid transporting network selected from pipelines and hydraulic systems.

17. The method of operating a fluid distributing network of claim 1 wherein the fluid distributing network is fluid processing equipment or is a fluid processing device wherein fluid condenses or evaporates when in contact with the fluid network.

18. The method of operating a fluid distributing network of claim 1 wherein the fluid distributing network is fluid processing equipment or is a fluid processing device wherein fluid changes its temperature when in contact with the fluid network.

\* \* \* \* \*